Sept. 30, 1941.    I. V. ABADJIEFF    2,257,444
PHOTOGRAPHIC FILM TRANSPORTER
Filed Nov. 14, 1938
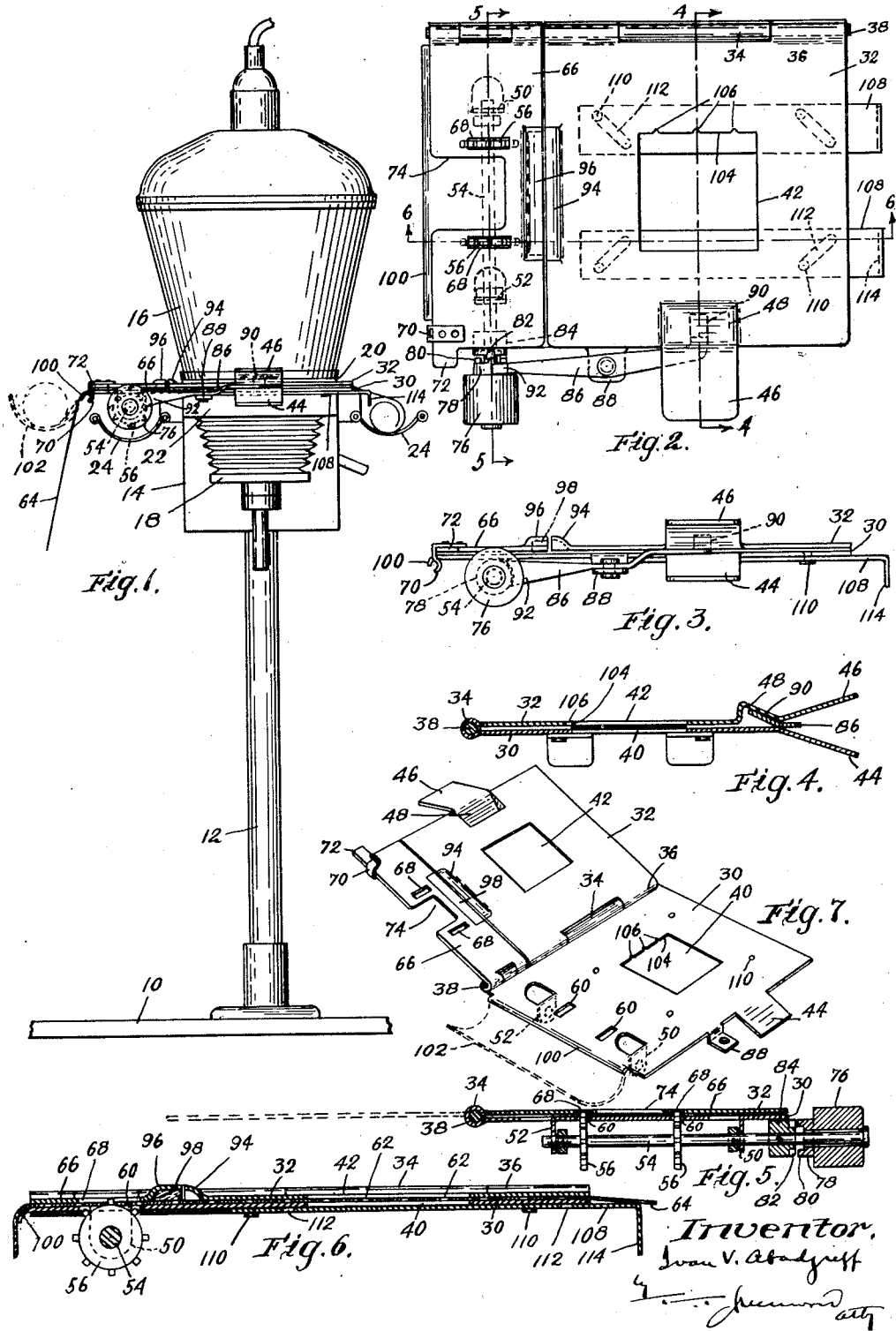
Inventor,
Ivan V. Abadjieff Patented Sept. 30, 1941

2,257,444

UNITED STATES PATENT OFFICE 2,257,444

PHOTOGRAPHIC FILM TRANSPORTER

Ivan V. Abadjieff, Worcester, Mass.

Application November 14, 1938, Serial No. 240,289

10 Claims. (Cl. 88—24)

This invention relates to photography and particularly to photographic enlargers which project light through a negative onto a photographic printing paper.

The invention is particularly concerned with the feeding of film strips containing several pictures through the enlarger and particularly with the feeding of 35 millimeter film such as is commonly used in miniature cameras and having at least one line and usually two lines of perforations in the marginal portions of the strip.

It is the usual practice at the present time to insert the film strip between a pair of holding plates, which either may be transparent or have aligned apertures therein, and insert the plates in the enlarger where usually they are pressed together by spring fingers. After one picture has been printed and it is desired to advance the strip to the next picture section it is usually necessary to remove these plates and the interposed film from the enlarger so as to free the plates from the spring pressure and then to separate the plates at least sufficiently to advance the film to the desired position. This practice entails some little labor and takes time and when a large number of prints have to be made becomes tedious.

It is an object of the present invention to provide a film holder for an enlarger wherein the holder is provided with film driving means capable of being operated to advance the film the desired amount while the holder is in printing position in the enlarger.

It is a further object of the invention to provide a film holder including a pair of plates between which the film is adapted to be located, with film driving means for advancing the film strip and with means to separate the plates at the time the strip is to be advanced so that the films can be advanced free from restraint, all without removing the holder from the enlarger.

It is another object of the invention to have the plate separating means and the film driving means operated by a common actuating member in such manner that the act of starting the advance of the film causes the separation of the plates prior to the movement of the film.

The usual enlarger is arranged to provide different distances of separation between the film and the printing paper so as to vary the amount of enlargement, or it may be reduction, of the negative. Some enlargers are provided with a scale confronting a movable part of the lamp house to indicate the amount of enlargement but ordinarily enlargers, and especially those adapted for the smaller sizes of negatives, have no means for determining accurately the amount of enlargement and moreover with enlargers provided with scales the scales are not helpful under some instances as where the printing paper is not supported directly upon the regular easel. It is desirable to know accurately the amount of enlargement for many purposes especially where a print of a negative has been made at one time and a record of the length of exposure made and it is subsequently desired to make a smaller or a larger print from the same negative. If the different enlargements are definitely known the length of exposure of the second print can be accurately calculated from the known exposure of the first print.

Hence it is an object of the present invention to provide the film holder with enlargement measuring indicia located substantially in the plane of the film and which are projected onto the plane of the printing paper at positions indicative of the amount of enlargement. Thus by knowing the actual distance between the indicia and measuring the projected distance on the easel the amount of enlargement can be ascertained accurately.

Some film strips bear consecutive numbers on a marginal portion thereof denoting the number of the negative in the strip. For some purposes it is desirable to print this number and for other purposes it is desirable to eliminate the number. Hence a further object of the present invention is the provision of a film holder having movable masking strips which are adapted to be moved at will into and out of overlapping relation with marginal portions of the film to permit or prevent the printing of the marginal portions of the film.

A further object of the invention is generally to improve the construction and operation of strip film holding and advancing devices.

Fig. 1 is a front elevation of a photographic enlarger with my invention associated therewith.

Fig. 2 is a plan view of the film holding and advancing device embodying the present invention.

Fig. 3 is a side elevation of the device of Fig. 2.

Fig. 4 is a section taken along line 4—4 of Fig. 2.

Fig. 5 is a section taken along line 5—5 of Fig. 2.

Fig. 6 is a section taken along line 6—6 of Fig. 2.

Fig. 7 is a view of the holding plates of the device of Fig. 2 in open position, the film advancing and plate separating mechanism being removed.

The enlarger in connection with which may invention is herein illustrated includes a supporting base 10 adapted to support the easel on which the printing paper is positioned. A post 12 upstands vertically above the base 10 and carries a vertically movable bracket 14 supporting a lamp house 16 and a lens structure 18. The bracket also has parallel vertically spaced upper and lower plates 20 and 22 through which the light from the lamp house is projected and between which the film to be printed is adapted to be located. The lower plate 22 carries at each end film holding troughs 24. Within the slot between the plates 20 and 22 usually are positioned spring fingers, not shown, for holding the film or the plates which enclose the film releasably in fixed position. The enlarger as thus described is generally typical of any enlarger with which my invention is adapted to be used and enlargers of different makes and adapted for different sizes of film may be differently constructed.

The film holder embodying the present invention comprises a bottom plate 30 and a top plate 32, the similar edges of the plates being curled over to provide hinges 34 and 36 which are pivotally connected by the hinge pin 38 so that the upper plate can lie over the bottom plate with a film strip interposed therebetween. The two plates are provided with registering openings 40 and 42, respectively, which openings or apertures have dimensions substantially corresponding in length to the length of the film negative and corresponding in width about to the width of the film, or being sufficiently greater in width than the width of the negative so that the film number on the strip, if the strip has a number, can be projected into the printing paper.

The holder is adapted to be inserted in the enlarger slot between the two plates 20 and 22 with a suitable amount of vertical clearance between the holder and the upper plate 20 when the holder rests on the lower plate 22. The front end of the bottom plate 30 is provided with a downwardly directed forwardly projected finger piece or handle 44. The upper plate is provided with a similar but upwardly directed finger piece 46 which has an upwardly and rearwardly directed, or inclined, cam part 48, the purpose of which will be explained hereinafter. The length of the two plates 30 and 32 is preferably such as to extend slightly beyond the opposite sides of the enlarger slot.

The plate 30, however, is longer than the plate 32 and extends further towards the left where it is provided with down struck ears 50 and 52 in which a sprocket shaft 54 is journalled. Film driving sprockets 56 are fixed to said shaft and the teeth thereof project through slots 60 in the extended portion of the plate 30, the sprockets being suitably spaced on the shaft so that they mesh with the perforations 62 in the film strip 64, see Fig. 6.

A separate hold-down plate 66 is pivoted on the hinge pin 38 and is adapted to overlie the film on the plate 30 and has slots 68 therein registering with the slots 60 through which the tips of the sprocket teeth can be located for the purpose of holding the film in engagement with the sprocket teeth. The hold-down plate 66 has a spring latch 70 which is adapted to hook under the left hand edge of the bottom plate 30 so that the plate can be held releasably in film holding position. The plate 66 is also provided with a forwardly projecting finger engageable extension 72 by which the plate can be pressed upwardly to raise it free from the bottom plate. The hold-down plate thus holds the film in engagement with the sprockets at the time the upper plate 32 is raised from engagement with the film. The hold-down plate 66 is provided with a thumb notch 74 which is adapted to expose the film between the sprockets so as to permit the film to be held onto the sprockets by the thumb at the time the hold-down plate is raised from holding position.

The sprockets are rotated by a knob 76 which is rotatably loose on the sprocket shaft 54 and is free for axial movement thereon. The knob 76 is provided with a hub 78 which has clutch teeth 80 on the inner face thereof. Said clutch teeth confront cooperating interdental spaces between clutch teeth 82 on a hub 84 fixed to the sprocket shaft. Thus by moving the knob 76 inwardly to engage the clutch and then rotating the knob the sprocket shaft can be rotated and the film advanced.

Just prior to the time the film is advanced it is desired that the upper plate 32 be raised from engagement with the film so that the film is free from restraint when advancing. For this purpose a plate raising lever 86 is pivoted intermediate its ends to a forwardly projecting ear 88 of the bottom plate 30 located between the sprocket shaft and the cam section 48 of the upper plate. The right hand end of the lever projects freely into the space between the finger portions 44 and 46 of the upper and lower plates and is provided with an upturned cam end 90, see Figs. 2 and 4, which cooperates with the cam section 48 of the upper plate. Thus by swinging said lever in a clockwise direction, Fig. 2, the lever is caused to raise the upper plate.

The left hand end of the lever has an end portion 92 which confronts the hub 78 of the knob 76 and also abuts against the inner outstanding end face of the knob. Thus the act of pushing the knob inwardly to cause it to engage the clutch hub 84 of the sprocket shaft also forces the lever 86 to swing in a clockwise direction and elevate the upper plate. When the knob is released the weight of the plate, which may be assisted by the aforesaid spring fingers of the enlarger that press upon the upper plate, moves the plate downwardly upon the film and at the same time moves the knob outwardly and disengages it from driving connection with the driving shaft.

The upper plate 32 at the left hand edge thereof is provided with an upwardly struck inclined section 94, see especially Fig. 6, which overlies the path of the advancing film and serves to guide the leading edge of the film surely into the space between the two plates. The right hand edge of the hold-down plate 66 is provided with a similar upstruck portion 96 providing a recess in which is located a soft resilient wiping pad 98 that exerts sufficient pressure on the film to hold it against displacement when the upper plate 32 is elevated and also serves to wipe the contacting film surface free of dust.

The left hand edge of the bottom plate 30 can be provided with a downwardly curved bead 100, see especially Fig. 7, over which the film is adapted to be drawn when the film is in the underlying trough 24 of the enlarger, or said edge can be formed into a film holding trough 102, as indicated by dotted lines, Fig. 7.

For denoting the amount of enlargement the rear side edge 104 of the opening 40 in the lower plate is provided with enlargement indicating means, herein illustrated as notches 106, which are spaced apart a known distance, as, for instance, one-half inch. The corresponding edge of the opening 42 in the upper plate is set back of these notches so that the notches can be projected onto the enlarger easel or other paper support. The distance between the projections of the notches on the easel when compared with the known actual distance between the notches gives an accurate measurement of the enlargement.

The bottom plate 30 is provided with a pair of opposed parallel edge masking strips 108 which closely overlie the bottom face of the bottom plate and are movably secured thereto by rivets or pins 110 which are fixed in the bottom plate and extend loosely through inclined parallel slots 112 of the plates. Thus by moving the plates longitudinally of itself in one direction or another the plates are caused to move outwardly or inwardly of the opening 40. The strips extend beyond the right hand edge of the holder and are provided with downturned fingers 114 by which the plates can be conveniently grasped for manipulation. By the provision of said masking strips the width of the film exposed for printing through the opening 40 can be adjusted so that the marginal portions of the strip can be printed or not as desired.

I claim:

1. A photographic film transporter comprising a pair of superimposed upper and lower apertured plates adapted to receive the film between them, said plates being hingedly connected at their similar edges and at their free end parts having extended superposed finger-engaging tabs, the lower plate being projected endwise beyond the edge of the upper plate, a film engaging and driving wheel mounted on the projected part of said lower plate beside said upper plate for moving the film between the plates and over the apertures, and a third plate beside said upper plate over said wheel for holding the film in engagement with said driving wheel and having a hinged connection with the projected part of said lower plate.

2. A photographic film transporter comprising upper and lower apertured hinged plates adapted to receive the film between them, a film driving wheel having a rotatable support on one of said plates and having a driving periphery located in the line between said plates for engaging a film and advancing it along the space between said plates and over the apertures, and a hold-down plate separately hinged to said lower plate above said wheel and disposed to hold a film in engagement with the film driving wheel.

3. A photographic film transporter comprising upper and lower apertured hinged plates adapted to receive a film between them, a sprocket wheel disposed under and journalled on said lower plate and having a portion of its periphery projected above said lower plate and adapted to engage and advance the film along the space between said plates and over the apertures, and a film hold-down plate hinged to said lower plate and positioned closely over said wheel, said upper plate being movable about its hinge independently of said hold-down plate.

4. A photographic film transporter comprising upper and lower apertured hinged plates adapted to receive a film between them, a sprocket wheel disposed under and journalled on said lower plate and having a portion of its periphery projected above said lower plate and adapted to engage and advance the film along the space between said plates and over the apertures, a film hold-down plate hinged to said lower plate and positioned over said wheel, and means for releasably connecting said hold-down plate to said lower plate, said upper plate being movable about its hinge independently of said hold-down plate.

5. A photographic film transporter including upper and lower apertured hinged plates adapted to receive a film strip between them, said lower plate being extended beyond one side of said upper plate and having slots therein in line with the aperture of said lower plate, a sprocket shaft located below and journalled on said plate extension, film driving sprockets fixed to said shaft and extended through said slots, and a film hold-down plate hinged to said lower plate and closely overlying said extension and having sprocket receiving slots therein, said upper plate being movable away from said lower plate independently of said hold-down plate.

6. A photographic film transporter including upper and lower apertured hinged plates adapted to receive a film strip between them, said lower plate being extended beyond one side of said upper plate and having slots therein in line with the aperture of said lower plate, a sprocket shaft located below and journalled on said plate extension, film driving sprockets fixed to said shaft and extended through said slots, and a film hold-down plate hinged to said lower plate and overlying said extension and having sprocket receiving slots therein, said hold-down plate having a thumb notch therein between the slots therein through which said bottom plate and the film thereon is exposed.

7. A photographic film transporter comprising upper and lower apertured hinged plates adapted to receive a film between them, film engaging and driving means carried by said lower plate beside said upper plate, and an operating member for said driving means, means under control of said operating member for effecting separation of said plates, and a third plate hinged to and overlying said lower plate beside said upper plate and overlying said film engaging and driving means and operative to hold the film in engagement therewith.

8. A photographic film transporter comprising upper and lower apertured film engaging plates, film advancing means carried by one of said plates including a drive shaft having a clutch element, an operating knob having a corresponding clutch element, said knob and its clutch element being rotatably loose on said shaft and axially slidable thereon to engage the shaft clutch element and effect rotation of the shaft, plate separating means including a lever pivoted to swing in a plane parallel to the plane of said shaft having a part engageable with one of said plates to separate it from the other and having another part disposed in the line of movement of said knob and arranged to be moved in a plate separating direction in response to axial movement of said knob.

9. A photographic film transporter comprising upper and lower apertured film holding plates, said upper plate having a cam part, a lever pivoted to said lower plate having a cam part engageable with the cam part of said upper plate and operative to elevate said upper plate, film driving means carried by said lower plate including a drive shaft, an operating knob for rotating said shaft, said knob being free for axial movement on said shaft and said lever being positioned in the line of axial movement of said knob to be moved thereby to effect the raising of said upper plate.

10. A photographic film transporter comprising upper and lower apertured film engaging plates, said lower plate having an extension thereon located beyond said upper apertured plate, film engaging and driving sprockets supported by said extension and having film driving portions extending upwardly thereabove through said extension, mechanism for separating said plates, an operating member for driving said sprockets and also for operating said separating mechanism and a member located above said extension movable independently of said upper apertured plate for pressing the film into engagement with said sprockets for holding the film in driving engagement therewith when said upper and lower apertured plates are separated.

IVAN V. ABADJIEFF.